United States Patent
Liu et al.

(10) Patent No.: US 8,868,937 B2
(45) Date of Patent: *Oct. 21, 2014

(54) METHOD OF REMOTELY CONTROLLING POWER DISTRIBUTION UNITS WITHOUT KNOWING THEIR IP ADDRESSES

(75) Inventors: Hsien-Hsun Liu, Taipei (TW); Hung-Ming Hsieh, Taipei (TW); Hung-Chun Chien, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 643 days.

This patent is subject to a terminal disclaimer.

(21) Appl. No.: 13/156,253

(22) Filed: Jun. 8, 2011

(65) Prior Publication Data

US 2012/0317428 A1 Dec. 13, 2012

(51) Int. Cl.
*G06F 1/00* (2006.01)
*H04N 1/00* (2006.01)
*H04L 12/12* (2006.01)
*G06F 1/26* (2006.01)

(52) U.S. Cl.
CPC ........ H04L 12/12 (2013.01); *H04N 2201/3205* (2013.01); *Y02B 60/35* (2013.01); H04N 1/00891 (2013.01); *H04N 2201/0039* (2013.01); *Y02B 60/34* (2013.01); H04N 1/00244 (2013.01); *H04N 2201/3208* (2013.01); *Y02B 60/33* (2013.01); H04N 1/00907 (2013.01); *H04N 2201/3278* (2013.01); G06F 1/266 (2013.01); H04N 1/00344 (2013.01); *H04N 2201/0072* (2013.01); *H04N 2201/3273* (2013.01)
USPC ........................................................ 713/300

(58) Field of Classification Search
CPC ............. G06F 1/26; G06F 1/266; G06F 1/18; H04L 12/12
USPC ......................................................... 713/300
See application file for complete search history.

(56) References Cited

U.S. PATENT DOCUMENTS

| | | | |
|---|---|---|---|
| 2002/0174251 A1* | 11/2002 | Lasserre | 709/249 |
| 2003/0196136 A1* | 10/2003 | Haynes et al. | 714/13 |
| 2008/0019068 A1* | 1/2008 | Reynolds et al. | 361/93.1 |
| 2009/0215319 A1* | 8/2009 | Gandhi | 439/654 |
| 2009/0273334 A1* | 11/2009 | Holovacs et al. | 324/66 |
| 2010/0019575 A1* | 1/2010 | Verges | 307/38 |
| 2011/0062780 A1* | 3/2011 | Verges et al. | 307/38 |
| 2011/0187193 A1* | 8/2011 | Pan et al. | 307/39 |
| 2011/0197082 A1* | 8/2011 | Ingels et al. | 713/310 |
| 2011/0218689 A1* | 9/2011 | Chan et al. | 700/295 |
| 2011/0320827 A1* | 12/2011 | Siegman et al. | 713/300 |
| 2012/0017102 A1* | 1/2012 | Turicchi, Jr. et al. | 713/300 |
| 2012/0119577 A1* | 5/2012 | Clarke | 307/40 |
| 2012/0246492 A1* | 9/2012 | Ho et al. | 713/300 |

* cited by examiner

*Primary Examiner* — Mohammed Rehman
(74) *Attorney, Agent, or Firm* — Tracy M. Heims; Apex Juris, pllc

(57) ABSTRACT

A method of remotely controlling power distribution units enables the power distribution units to automatically transmit messages to a server once connected to the server via a network. When a user logs into a server and requests to remotely control the associated power distribution units, the user only needs to enter the serial numbers or identification data thereof. The server then automatically searches for all power distribution units owned by the user, and provides a group management interface. The user can then group the power distribution units according to their locations or their properties in order to control the on and off thereof. Without knowing the IP addresses of the power distribution units, the user can readily control the power distribution units at different locations remotely.

9 Claims, 5 Drawing Sheets

| Serial number | Device | Location |
|---|---|---|
| I8SUJ37RG | PDU_1 | Taipei |
| UD6FYH48W | PDU_a | Hsinchu |
| K8U3HE6RU | PDU_b | Hsinchu |
| LKWER239J | PDU_A | Yilan |
| K3IV23ID9 | PDU_2 | Taipei |
| KER1239U8 | PDU_c | Hsinchu |
| 9DKEU73F8 | PDU_B | Yilan |
| OKU86TR4F | PDU_3 | Taipei |
| JUHY6789H | PDU_Y | Kaohsiung |
| POJG5784F | PDU_X | Kaohsiung |
| 35RT4F6YG | PDU_C | Yilan |
| 8U5TE4FGH | PDU_Z | Kaohsiung |

FIG. 4

METHOD OF REMOTELY CONTROLLING POWER DISTRIBUTION UNITS WITHOUT KNOWING THEIR IP ADDRESSES

BACKGROUND OF THE INVENTION

1. Field of the Invention

The invention relates to a method of controlling power distribution units (PDUs) and, in particular, to a method of remotely managing and controlling PDUs without knowing their IP addresses.

2. Description of Related Art

Power management of information technology (IT) devices is a key to normal and safe operations thereof. To accommodate the power requirement of many IT devices or peripheral devices, a power distribution unit (PDU) is often mounted on racks of the IT devices. Each PDU provides multiple sockets for the connection of multiple IT devices (e.g., servers, routers, firewalls, etc) or peripheral devices (e.g., printers, displays, fax machines, etc) and provides power required by the connected IT or peripheral devices. Each PDU is connected to an uninterruptable power system (UPS) for uninterruptable power supply. Currently, PDUs have many different types, such as the basic type, panel-control type, switching type and intelligent type. The switching and the intelligent PDUs are equipped with a remote on/off function to be powered on or off via a network.

In practice, the PDU can be powered on or off by remote control via a network, thereby turning on or off the power of all the IT or peripheral devices. Even so, there are still inconveniences to remotely control each of the PDUs as far as current technology is concerned.

According to usage requirements, the PDUs are installed at different locations and have different IP addresses. If a user wants to log into a management system to remotely control the PDUs belonging to the user, he or she has to clearly know the IP addresses of the PDUs. However, the user usually does not know the exact IP addresses of the PDUs. This renders the remote management and control extremely inconvenient. If the user owns a lot of PDUs, the problem becomes even more serious.

SUMMARY OF THE INVENTION

An objective of the invention is to provide a method of remotely controlling PDUs so that the user can conveniently perform remote control on the associated PDUs without knowing the exact IP addresses thereof. This makes the management and control of PDUs much easier.

To achieve the above-mentioned objective, a method of remotely controlling power distribution units comprises the steps of:

searching for PDUs connected to a network;

receiving a message automatically sent from each of the PDUs and establishing a message database;

allowing a user to log in and make a remote control request;

searching the message database to obtain the PDUs belonging to the user;

generating a management and control window that lists all the PDUs belonging to the user for the user to remotely control the PDUs.

According to the above-mentioned method, the PDUs automatically send messages to a server when connecting to the server for identification. The message can contain the product serial number or other identification data. When the user first logs onto the system, he or she only needs to enter the serial numbers or other identification information of the PDUs. The server then automatically searches for all the PDUs belonging to the user and lists them for the user to remotely control the PDUs at different locations. This method effectively avoids the troubles and inconvenience in the existing technology that requires the user to memorize the IP addresses of each of the PDUs.

BRIEF DESCRIPTION OF THE DRAWINGS

FIG. 4 is a schematic view of another page in the disclosed management and control window;

DETAILED DESCRIPTION OF THE PREFERRED EMBODIMENT

Figure 1:
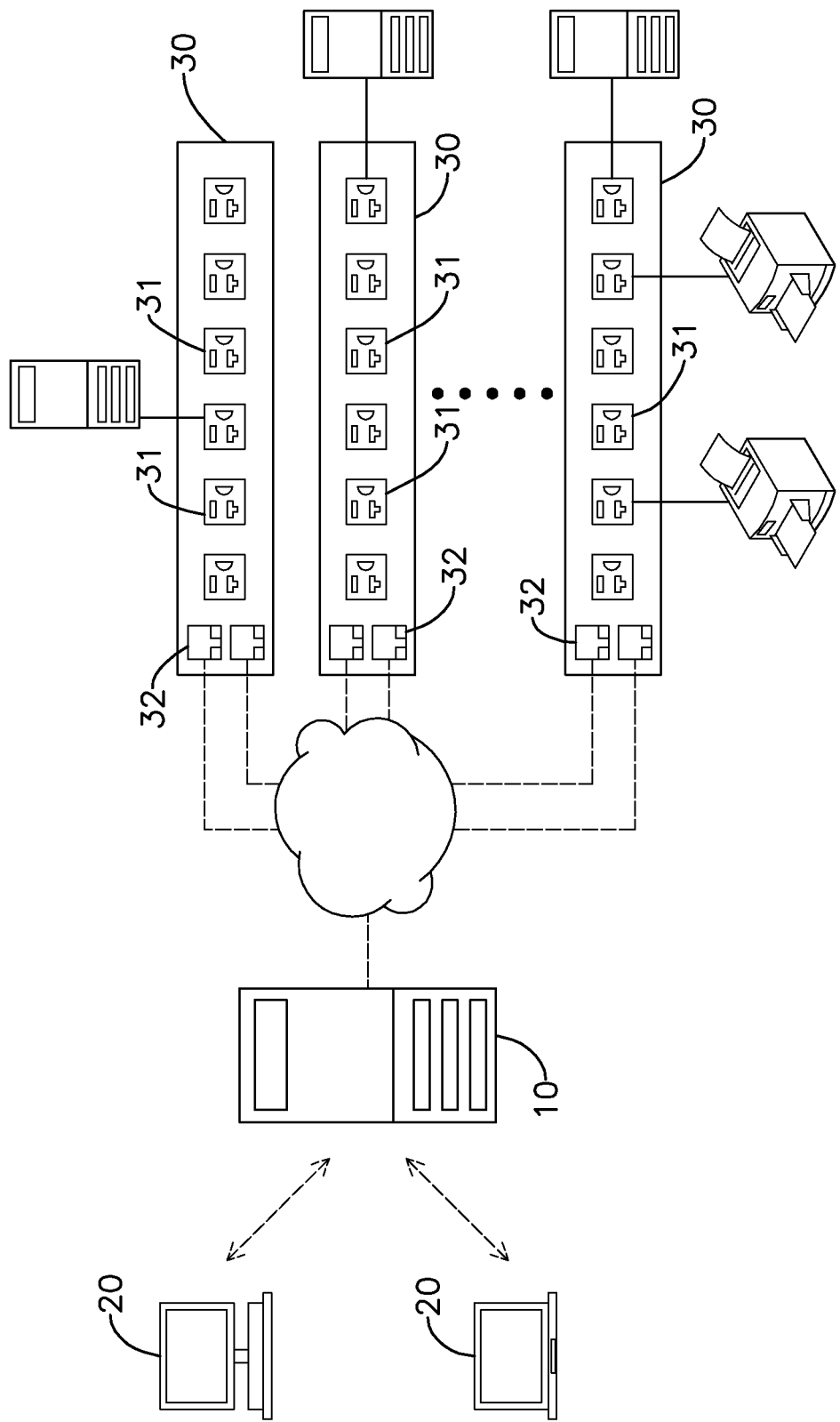
FIG. 1 is a schematic view of a network structure according to the invention.

With reference to FIG. 1, a server 10 is connected to several user devices 20 and several PDUs 30 via a network.

The user device 20 referred to herein can be a personal computer (PC), a notebook computer (NB), or a mobile phone with networking functions. Such devices are connected to the server 10 via the network.

Each PDU 30 has several power sockets 31 and several network ports 32. The power sockets 31 allow the connection between/among several devices. Each of the devices obtains operating power and emergency power from the corresponding PDU 30. The network port 32 is for the connection with the server 10. The connection protocol can be wired or wireless (e.g., LAN, WLAN) or other wired and wireless communication protocols (e.g., WIFI, ZIGBEE, etc). The server 10 is connected to the PDUs 30 via the above-mentioned feasible communication protocols.

Figure 2:
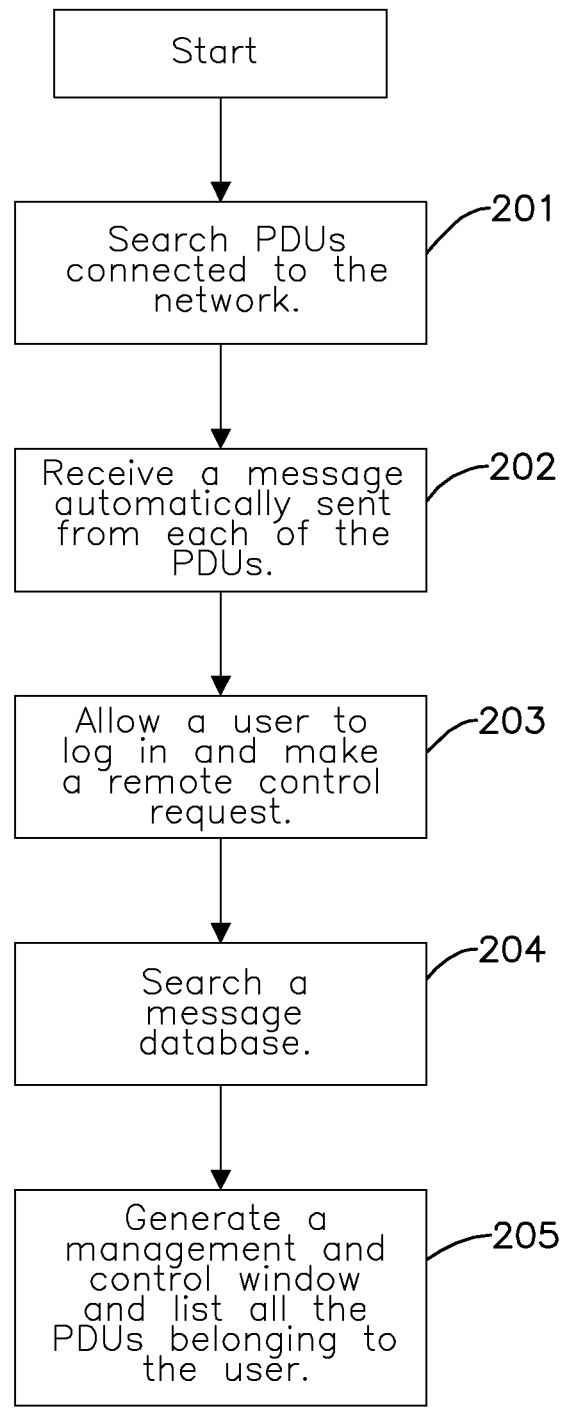
FIG. 2 is a flowchart of the disclosed method.

With reference to FIG. 2, a control method in accordance with the present invention enables the server 10 to execute the following steps (201-203) under the above-mentioned structure.

In step 201, the server 10 searches for PDUs connected to a network.

In step 202, the server 10 receives a message automatically sent from each of the PDUs and establishes a message database. In this step, each of the PDUs automatically sends a message to the server after connecting to the server. The message content can be a MAC (Media Access Control) number or a product serial number. According to the protocol, the first three codes of the MAC number are the registration code of the company (e.g., 00-0C-15-XX-XX-XX). Therefore, from the MAC number or product serial number, the server can identify to which company each of the connected PDUs respectively belongs.

In step 203, the server 10 allows a user to log in and make a remote control request. In this step, the user logs onto the server via one of the user devices 20 to remotely control the associated PDUs via the server. Before logging onto the server, the user is first asked to register to set up an ID/password.

In step 204, the server 10 searches the message database for the PDUs belonging to the user.

Figure 3:
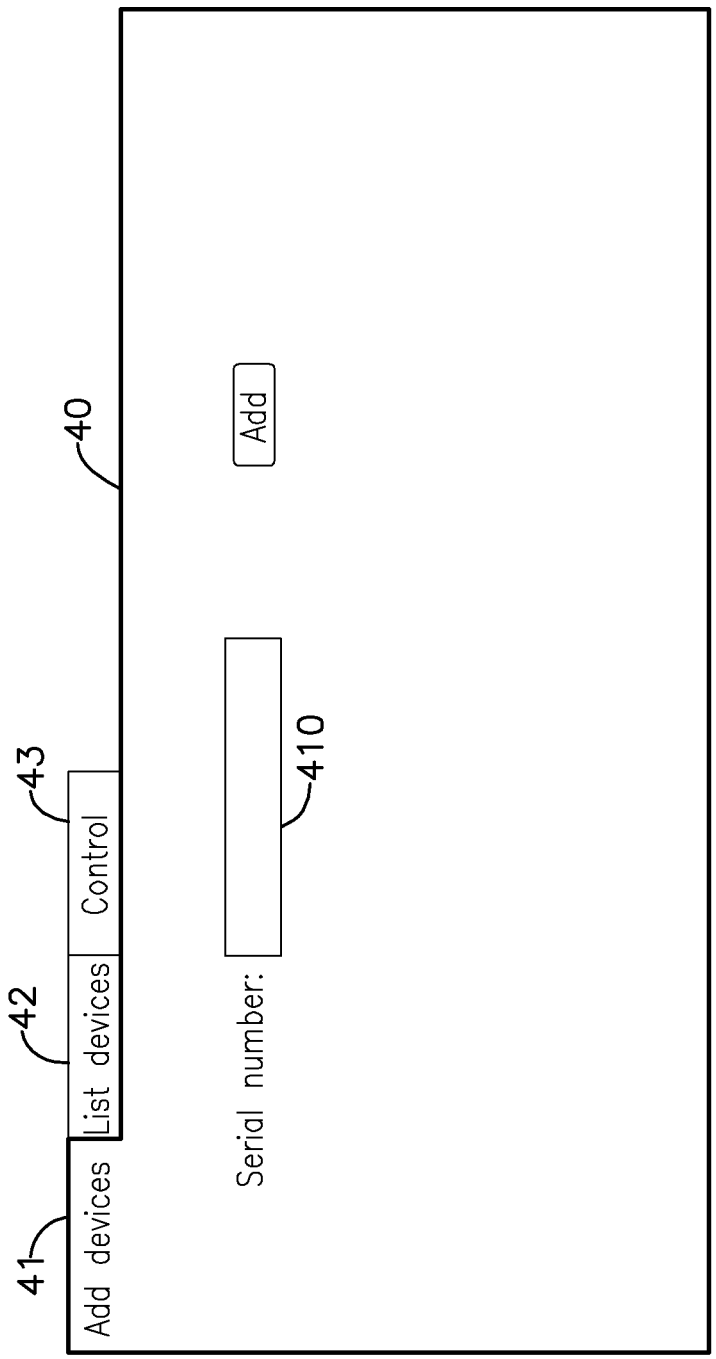
FIG. 3 is a schematic view of one page in the disclosed management and control window.

In step 205, the server 10 generates a management and control window that lists all the PDUs belonging to the user for remote control. When the user first uses the system, he or she enters the product serial numbers or identification information (strings). The server can thus search the message database for all PDUs owned by a user registered and entered by a specific account for remote control. With reference to FIG. 3, the management and control window 40 is a man-machine interface on a display. The management and control window 40 can be implemented by a folder including a device adding page 41, a device listing page 42, and a control page 43.

The device adding page 41 has a data entering field 410 for the user to enter the identification data of a new PDU for adding the PDU for remote control. In this embodiment, the data entering field 410 requires a product serial number.

The device listing page 42, as shown in FIG. 4, lists all the PDUs belonging to a specific user. In this embodiment, the device listing page 42 includes a serial number field 421, a device name field 422, and a location field 423 that respectively record the serial number (e.g., 18SUJ37RG), name (e.g., PDU_1, PDU_a, etc), and the location of a PDU. The content of the location field 423 is filled when the user adds a new PDU. The location becomes an assignment condition for re-assembling all the PDUs. The PDUs are divided into different groups according to their location. They are then collectively controlled in units of groups.

Figure 5:
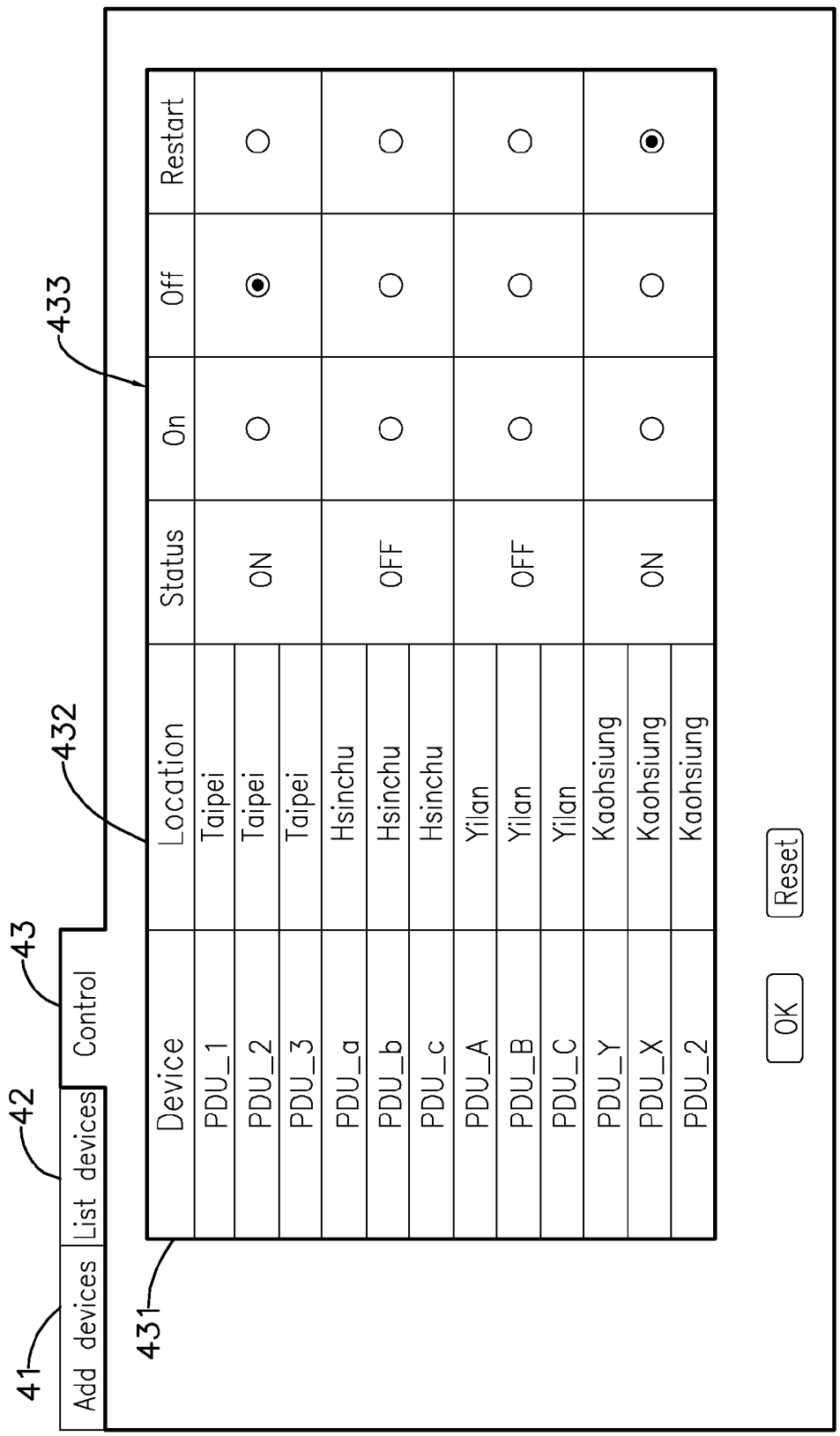
FIG. 5 is a schematic view of yet another page in the disclosed management and control window.

With reference to FIG. 5, when the user clicks the control page 43, all of the PDUs re-assembled according to the assignment conditions are listed. In this embodiment, the control page 43 uses the location of the PDUs as the assembly criterion. The PDUs of the user are listed in groups. The control page 43 includes a device name field 431, a location field 432, and a control option field 433. The location given in the location field 432 is used for grouping. The PDUs at the same location are collected together. A 'status' display item and various control options such as 'power on', 'power off', and 'restart' are provided in the control option field 433 in units of groups. The 'status' display item displays the statuses (on or off) of all PDUs at the same location. The control options of 'power on', 'power off', and 'restart' enable the user to collectively control the PDUs at the same location. With the above-mentioned functions, the user can remotely control the on and off of the PDUs at the same location. In addition to using 'location' as the grouping criterion, the invention can also use the device properties powered by the PDUs as the grouping condition, such as 'printers', 'servers', 'storages', etc. When the user uses the above-mentioned condition to group the PDUs, the user can remotely control the PDUs that serve devices of the same properties. For example, the user can simultaneously shut down the PDUs that power the printers.

Using the disclosed method, the user does not need to know the exact IP addresses of all the PDUs. The user can remotely control all of the PDUs easily and efficiently.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of remotely controlling power distribution units, the method being executed by a server connected to a network and comprising the steps of:
searching for a plurality of power distribution units connected to the network;
receiving a message automatically sent out from each of the power distribution units and establishing a message database;
allowing a user to log in and make a remote control request;
searching the message database to obtain the power distribution units belonging to the user;
generating a management and control window to list all the power distribution units of the user for the user to control remotely, wherein the management and control window includes:
an equipment adding page having a data entering field for the user to add identification data of a new power distribution unit, thereby adding the new power distribution unit to remotely control;
an equipment listing page for listing all the power distribution units belonging to a specific user obtained after searching;
a controlling page for organizing all the power distribution units of the specific user according to a specified condition, thereby allowing the user to collectively control all of the power distribution units satisfying the same specified condition.

2. The method as claimed in claim 1, wherein the identification data for the newly added power distribution unit is the MAC thereof.

3. The method as claimed in claim 2, wherein the controlling page of the management and control window uses locations of the power distribution units as the specified condition, sets the power distribution units of the same location in one group, and allows the user to collectively control the power distribution units in units of groups.

4. The method as claimed in claim 2, wherein the controlling page of the management and control window uses powering properties of the power distribution units as the specified condition, and allows the user to remotely control the power distribution units that serve equipment of the same powering property.

5. The method as claimed in claim 1, wherein the identification data for the newly added power distribution unit is a serial number thereof.

6. The method as claimed in claim 5, wherein the controlling page of the management and control window uses locations of the power distribution units as the specified condition, sets the power distribution units of the same location in one group, and allows the user to collectively control the power distribution units in units of groups.

7. The method as claimed in claim 5, wherein the controlling page of the management and control window uses powering properties of the power distribution units as the specified condition, and allows the user to remotely control the power distribution units that serve equipment of the same powering property.

8. The method as claimed in claim 1, wherein the controlling page of the management and control window uses locations of the power distribution units as the specified condition, sets the power distribution units of the same location in one group, and allows the user to collectively control the power distribution units in units of groups.

9. The method as claimed in claim 1, wherein the controlling page of the management and control window uses powering properties of the power distribution units as the specified condition, and allows the user to remotely control the power distribution units that serve equipment of the same powering property.

* * * * *